US010181777B2

(12) United States Patent
Borrmann et al.

(10) Patent No.: US 10,181,777 B2
(45) Date of Patent: Jan. 15, 2019

(54) METHOD FOR FORMING AT LEAST ONE U-SHAPED WINDING ELEMENT FOR AN ELECTROMAGNETICALLY EXCITABLE CORE OF AN ELECTRIC ROTATION MACHINE

(71) Applicant: Robert Bosch GmbH, Stuttgart (DE)

(72) Inventors: Paul Borrmann, Goettingen (DE); Dittmar Kleemann, Friedland (DE); Peter Schreiber, Niemetal (DE); Hans-Juergen Schwarz, Goettingen (DE); Klaus Hilke, Berlin (DE)

(73) Assignee: SEG Automotive Germany GmbH, Stuttgart (DE)

( * ) Notice: Subject to any disclaimer, the term of this patent is extended or adjusted under 35 U.S.C. 154(b) by 268 days.

(21) Appl. No.: 14/972,557

(22) Filed: Dec. 17, 2015

(65) Prior Publication Data

US 2016/0181897 A1   Jun. 23, 2016

(30) Foreign Application Priority Data

Dec. 17, 2014   (DE) .......................... 10 2014 226 224

(51) Int. Cl.
*H02K 15/04*   (2006.01)
*B23P 19/12*   (2006.01)
(Continued)

(52) U.S. Cl.
CPC .......... *H02K 15/0421* (2013.01); *B23P 19/04* (2013.01); *B23P 19/12* (2013.01);
(Continued)

(58) Field of Classification Search
CPC ........... H02K 15/0421; H02K 15/0428; H02K 15/067; B23P 19/04; B23P 19/12; Y10T 29/49009; Y10T 29/49012
See application file for complete search history.

(56) References Cited

U.S. PATENT DOCUMENTS

| 7,140,098 | B2 * | 11/2006 | Maeda | ............... | H02K 15/0428 |
| | | | | | 29/732 |
| 7,726,007 | B2 * | 6/2010 | Kato | .................. | H02K 15/0428 |
| | | | | | 29/598 |

(Continued)

FOREIGN PATENT DOCUMENTS

| DE | 3447506 A1 | 7/1985 |
| DE | 3741391 C1 | 4/1989 |

(Continued)

OTHER PUBLICATIONS

Search Report from the French Intellectual Property Office for Application No. FR1562366 dated Aug. 17, 2018 (8 pages).

*Primary Examiner* — A. Dexter Tugbang
(74) *Attorney, Agent, or Firm* — Michael Best & Friedrich LLP

(57) ABSTRACT

Method for forming at least one U-shaped winding element (10) for an electromagnetically excitable core (11) of an electric rotation machine (12), wherein the U-shaped winding element (10) has a first rod section (13) and a second rod section (15) which are connected by an arcuate connection section (16), wherein an inner tool part (23) having at least one recess (29) in the region of its outer circumference is provided, and an outer tool part (26) having at least one recess (30) in the region of its inner circumference is provided, and at least the U-shaped winding element (10) is inserted into the inner tool part (23) and the outer tool part (26) such that one rod section (13) is inserted into a recess (29) of the inner tool part (23), the other rod section (15) is inserted into a recess (30) of the outer tool part (26), and such that the inner tool part (23) and the outer tool part (26) are rotated with respect to one another about the axis of rotation (36), wherein in that context the at least two rod sections (13, 15) are moved away from one another, wherein, prior to the at least two rod sections (13, 15) being (Continued)

moved away from one another, a gripping element (50) having a tooth (53) is moved toward a rod section (15), which is gripped by means of a tooth (53).

13 Claims, 14 Drawing Sheets

(51) Int. Cl.
  *H02K 15/06* (2006.01)
  *B23P 19/04* (2006.01)
(52) U.S. Cl.
  CPC ....... *H02K 15/0428* (2013.01); *H02K 15/067* (2013.01); *Y10T 29/49009* (2015.01); *Y10T 29/49012* (2015.01)

(56) References Cited

U.S. PATENT DOCUMENTS

| | | |
|---|---|---|
| 2005/0166393 A1 | 8/2005 | Sawada |
| 2006/0001327 A1 | 1/2006 | Ossenkopp et al. |
| 2009/0265909 A1 | 10/2009 | Guercioni |

FOREIGN PATENT DOCUMENTS

| | | | |
|---|---|---|---|
| DE | 60125177 T2 | | 3/2007 |
| JP | 2007089273 A | * | 4/2007 |

\* cited by examiner

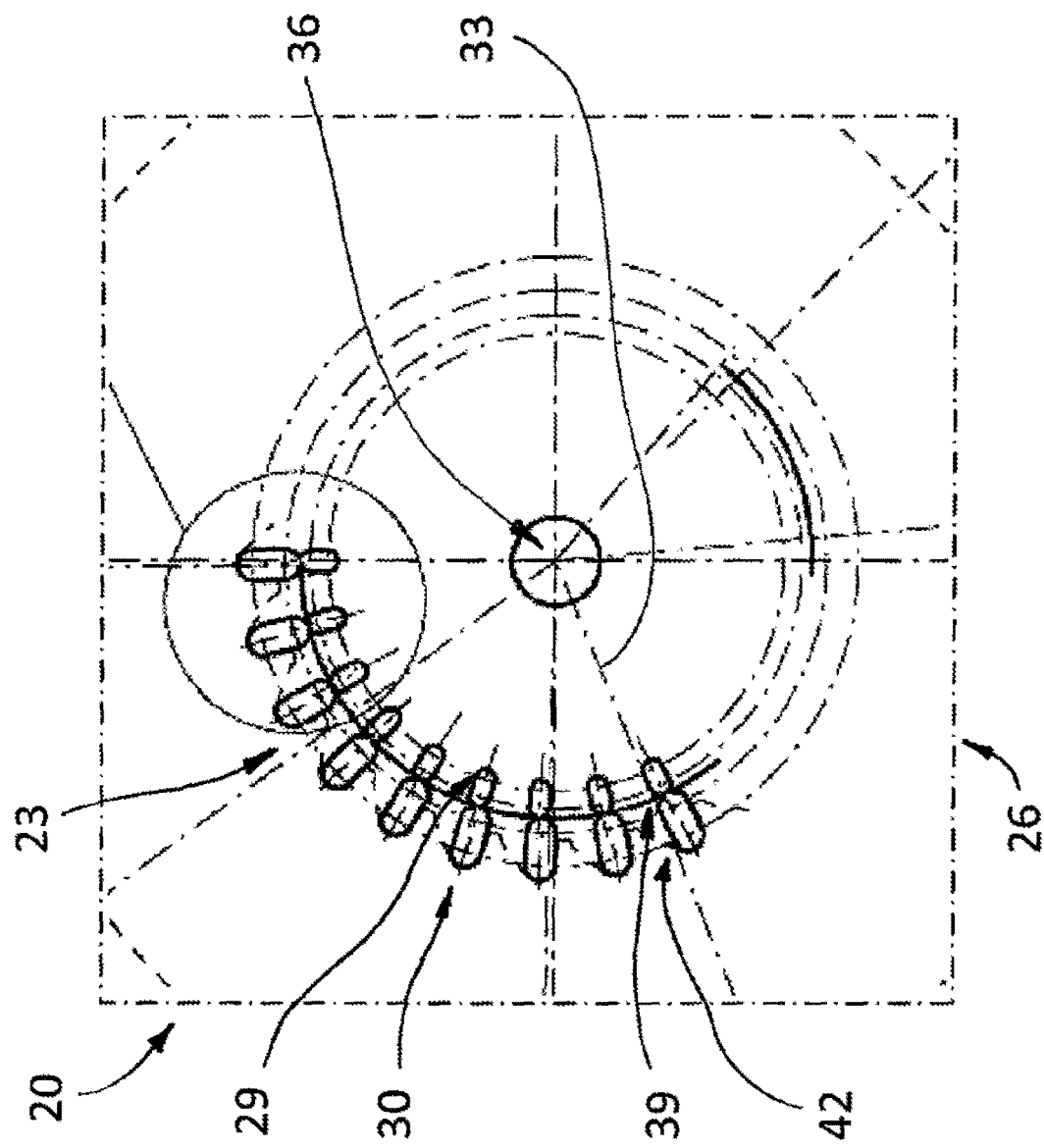

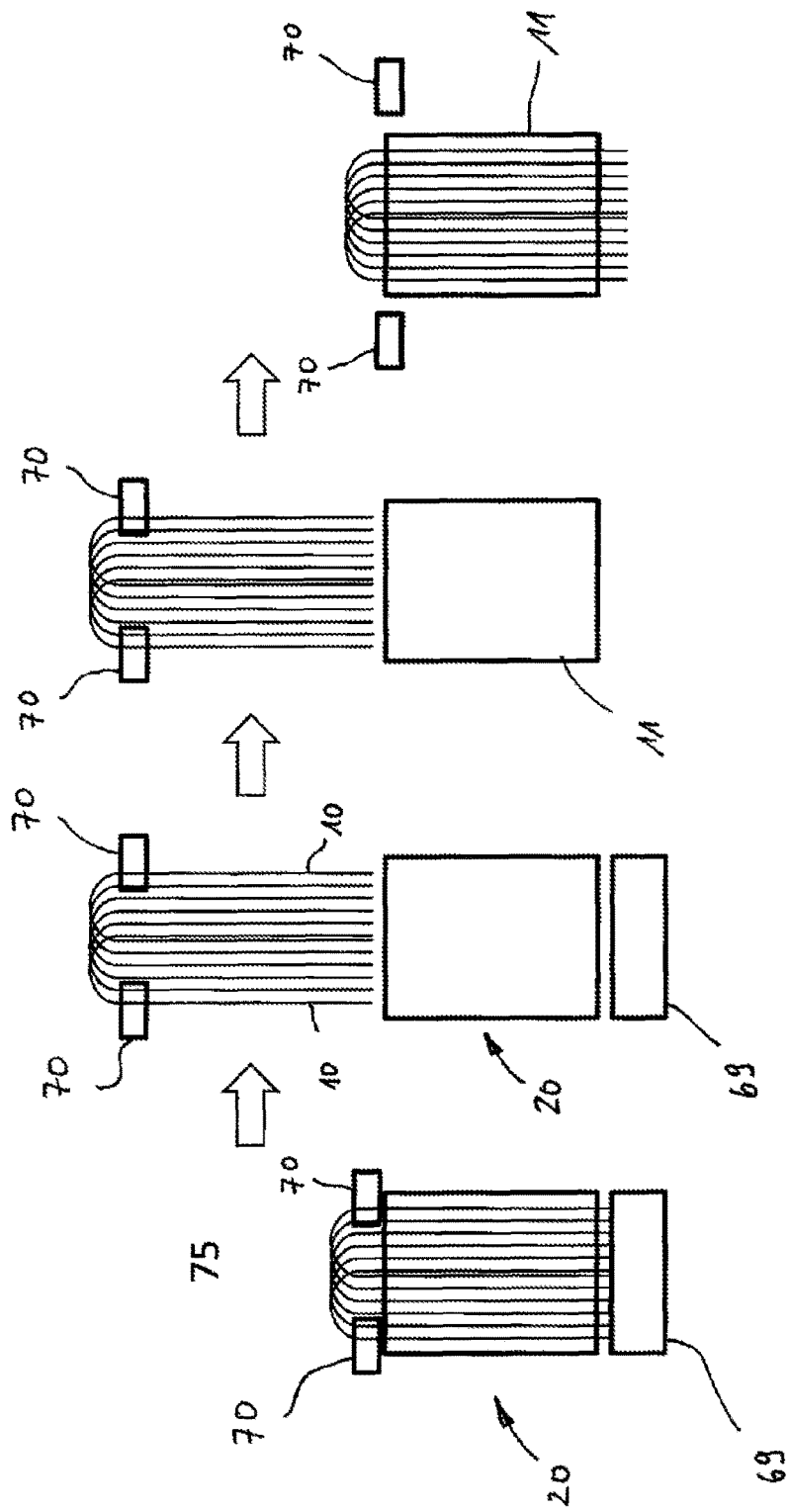

METHOD FOR FORMING AT LEAST ONE U-SHAPED WINDING ELEMENT FOR AN ELECTROMAGNETICALLY EXCITABLE CORE OF AN ELECTRIC ROTATION MACHINE

BACKGROUND OF THE INVENTION

Methods for forming at least one U-shaped winding element for an electromagnetically excitable core of an electric rotation machine are known from the prior art. In that context, the U-shaped winding elements or, respectively, the rod sections of these, are pulled apart and it is attempted, by holding down or pressing down, to hold the U-shaped winding elements largely in the shaping tool. However, displacements of the U-shaped winding element generally arise in the process, such that a winding head is axially longer than is desired.

SUMMARY OF THE INVENTION

The object in the context of this application is to prevent, as much as possible, displacements of the U-shaped winding element.

BRIEF DESCRIPTION OF THE DRAWINGS

FIG. 2 is a detail plan view of a setting tool,

FIGS. 15a, 15b, 15c and 15d show, schematically, the procedures for removing the winding elements from the setting tool and for insertion into an electromagnetically excitable core.

DETAILED DESCRIPTION

Figure 1:
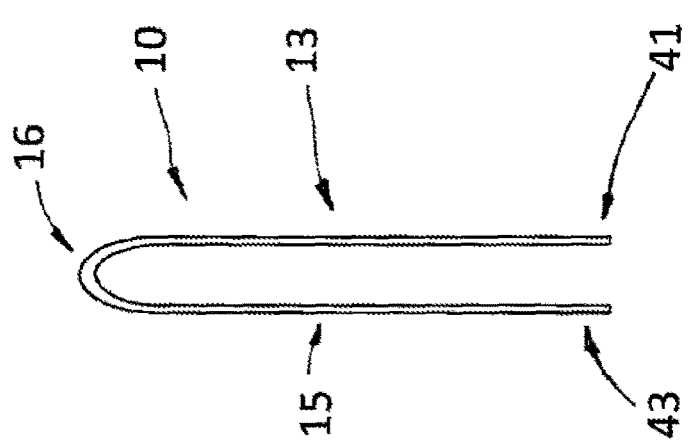
FIG. 1 shows a U-shaped winding element.

FIG. 1 shows a U-shaped winding element 10, as is used for example for the production of armatures (rotors) of direct-current motors or also for the production of armatures (stators) of alternating-current machines, such as three-phase generators. This U-shaped winding element 10 has a first rod section 13 and a second rod section 15 which are connected by an arcuate connection section 16. If the armature, to be constructed, of a rotor has for example 25 grooves, then 25 such winding elements 10 must be used. Also known are for example armatures of rotors having 17 or 19 or another number of winding elements 10.

FIG. 2 shows a detail plan view of a setting tool 20. This setting tool 20 has an inner tool part 23 and an outer tool part 26. Both the inner tool part 23 and the outer tool part 26 each have 25 groove-like recesses 29 and, respectively, 30, which for example may also be embodied in the manner of a tube. In a starting position of the two tool parts 23 and 26, the recesses 29 and 30 are positioned directly opposite one another such that they have essentially or entirely the same angular position with respect to a common, imaginary line 33 through an axis of rotation 36. The recesses 29 and 30 each have a side wall 39 and, respectively, 42 which in this case are reference surfaces. That is to say that the recesses 29 and 30 are oriented with respect to one another such that the side walls 39 and 42 preferably lie in a common plane. The winding elements 10 sit with their ends 41, 43 on a stop element (which is not shown here and which, for example, can be the slider 69 in FIG. 9a), so as to give a minimum overhang between the arcuate connection section 16 and parts of the first rod section 13 and of the second rod section 15. This overhang allows the winding element 10 to be set.

Figure 3:
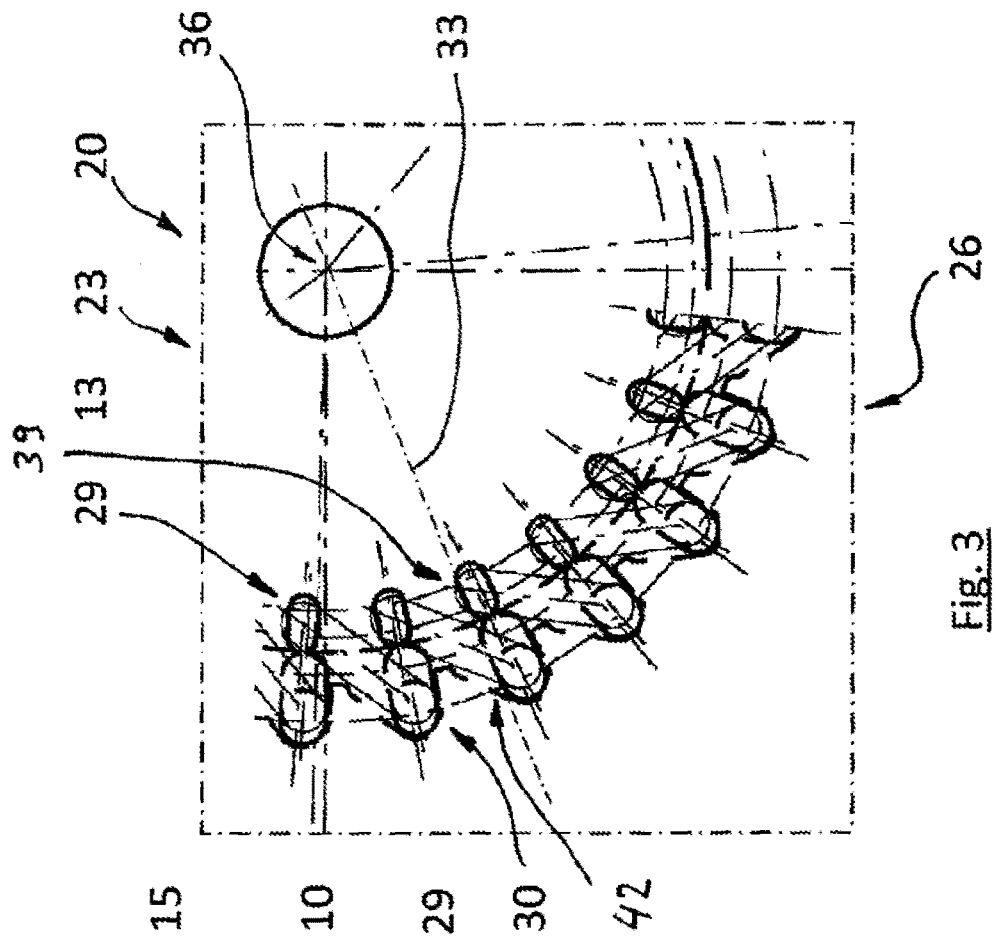
FIG. 3 shows how winding elements are inserted into a pair of recesses of the setting tool.
Figure 4:
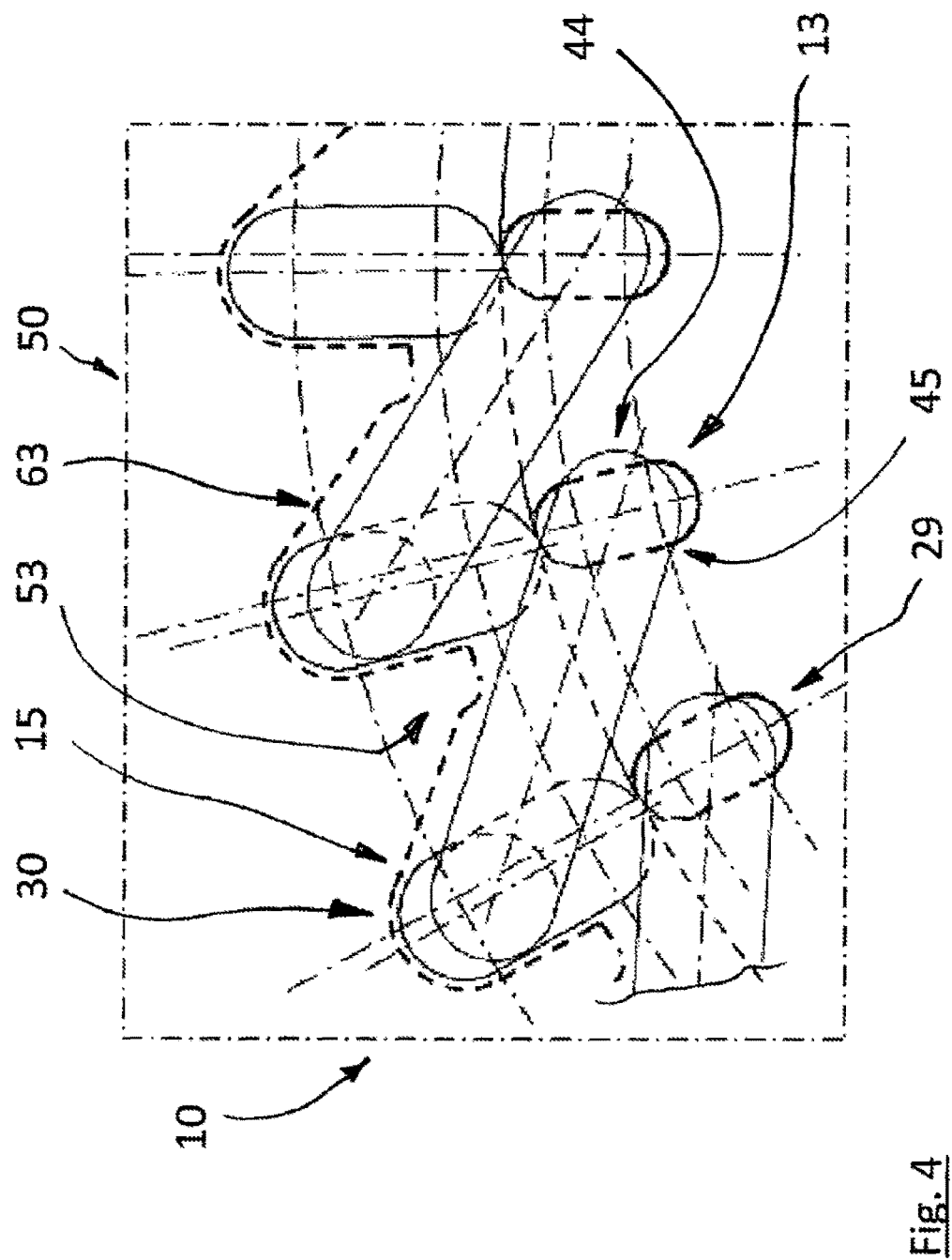
FIG. 4 shows details of the shape of a winding element.

FIG. 3 shows how winding elements 10 are inserted into a pair of recesses 29 and 30. It is in principle immaterial whether the winding elements 10 are used pre-set as shown in FIG. 3 or not pre-set. In this context, pre-set means that, in the starting position prior to rotation, a winding element 10 is inserted into recesses 29 and 30 which are not arranged directly opposite one another but offset with respect to one another. The winding element 10 has in this case an outer rod section 15 with a round wire cross section and an inner rod section 13 with two mutually parallel side faces 44 and 45 which are connected by rounds, see FIG. 4.

Furthermore, the setting tool 20 is provided with a gripping element 50. This gripping element 50 has at least one tooth 53. The gripping element 50 is preferably of arcuate construction and has, on an inner arc, for example eight teeth. Over the circumference of the outer tool part 26, there are provided in total preferably three preferably arcuate gripping elements 50. The other gripping elements have in this case preferably eight teeth in the case of one and nine teeth in the case of the other, such that all three gripping elements 50 overall preferably have 25 teeth 53. Thus, preferably, multiple gripping elements 50 with preferably in each case multiple teeth 53 are provided for use. It is thus possible for all 25 winding elements 10 to be gripped preferably simultaneously by the teeth 53.

Accordingly, there is provided a method according to which at least one U-shaped winding element 10 for an electromagnetically excitable core 11 of an electric rotation machine 12 is formed, wherein the U-shaped winding element 10 has a first rod section 13 and a second rod section 15 which are connected by an arcuate connection section 16, wherein an inner tool part 23 having at least one recess 29 in the region of its outer circumference is provided, and an outer tool part 26 having at least one recess 30 in the region of its inner circumference is provided, and at least the U-shaped winding element 10 is inserted into the inner tool part 23 and the outer tool part 26 such that one rod section 13 is inserted into a recess 29 of the inner tool part 23, the other rod section 15 is inserted into a recess 30 of the outer tool part 26, and such that the inner tool part 23 and the outer tool part 26 are rotated with respect to one another about the axis of rotation 36, wherein in that context the at least two rod sections 13, 15 of the at least one winding element 10 are moved away from one another, wherein, prior to the at least two rod sections 13, 15 being moved away from one another, a gripping element 50 having a tooth 53 is moved toward a rod section 15, which is gripped by means of a tooth 53.

Figure 5:
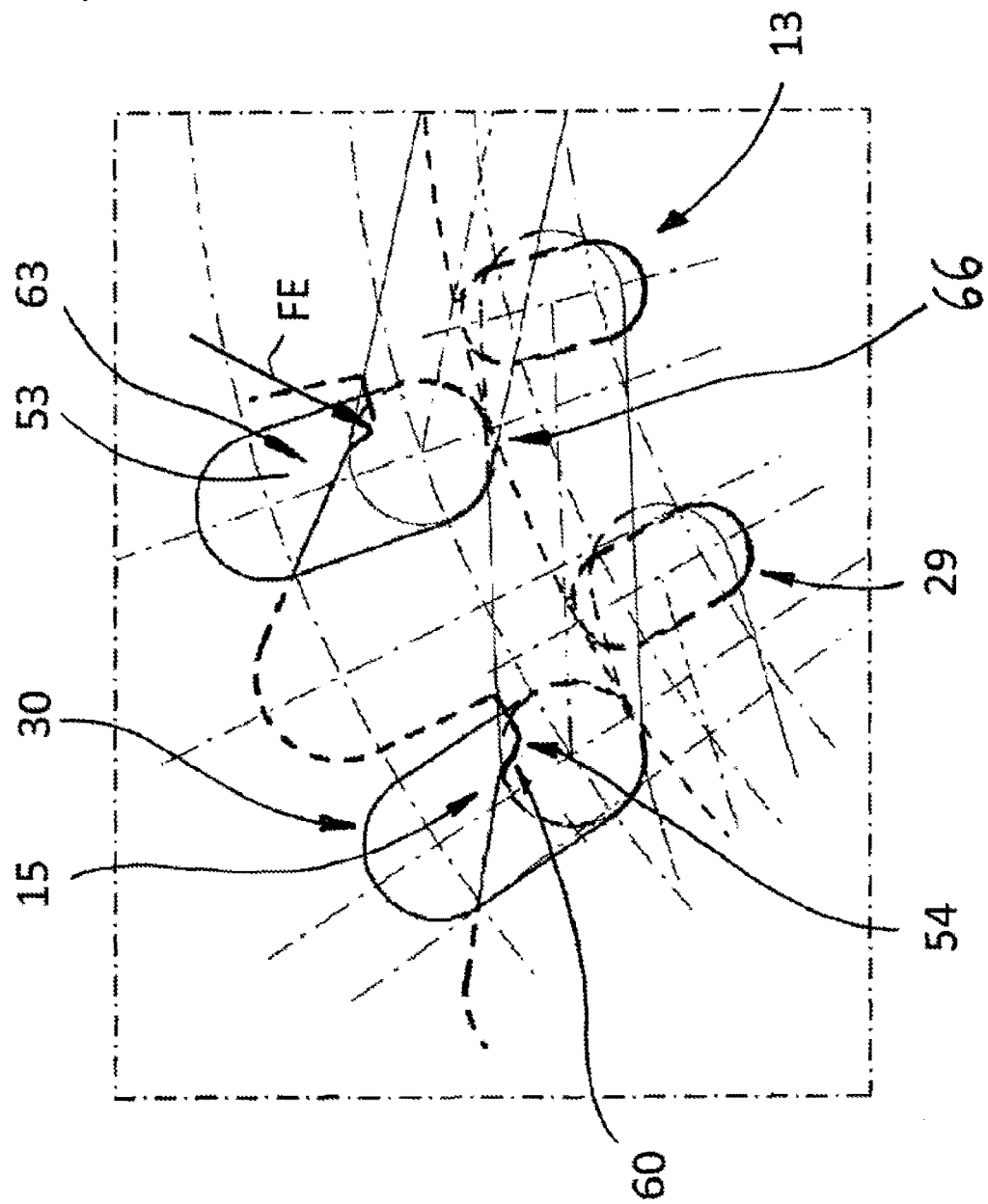
FIG. 5 shows how a gripping element with the tooth and the corner thereof presses an engagement contour into the rod section by shaping the rod section and thereby the tooth grips the rod section in a form-fitting manner with an engagement force.

In a further step, it is provided that the gripping element 50 with the tooth 53 and the corner 54 thereof presses an engagement contour 60 into the rod section 15 by shaping the rod section 15 and thereby the tooth 53 grips the rod section 15 in a form-fitting manner with an engagement force FE, see FIG. 5.

Figure 6:
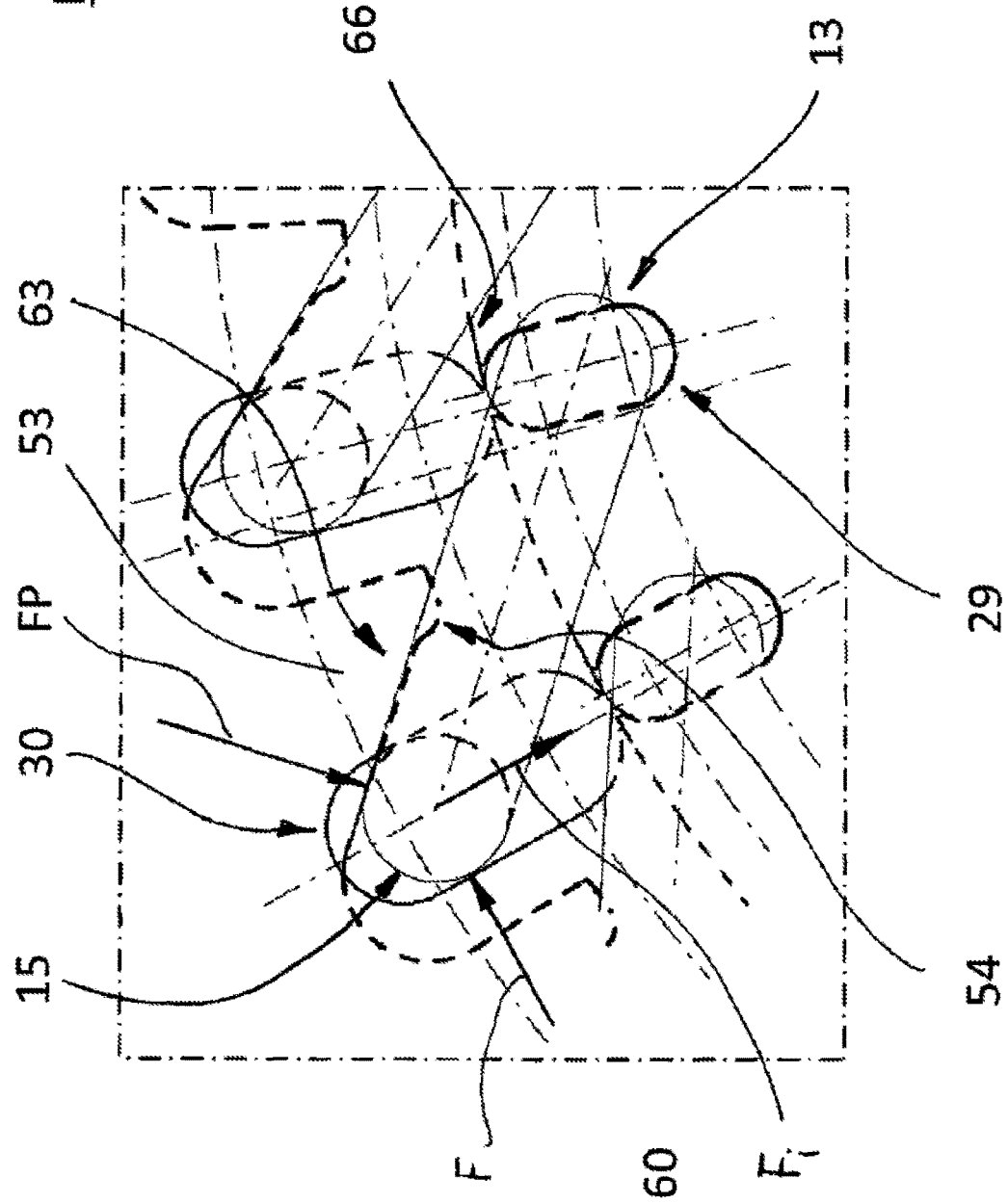
FIG. 6 shows how, prior to the tooth gripping the rod section, the rod section is pressed radially inward by the sliding bevel.

It is in particular provided that a tooth 53, when the tooth 53 is moved toward the rod section 15, exerts by means of a sliding bevel 63 a pressing force FP on the rod section 15 which, in conjunction with the recess 30 of the outer tool part 26, exerts a resulting force Fi radially inward. Thus, prior to the tooth 53 gripping the rod section 15, the rod section 15 is pressed by the sliding bevel 63 radially inward, see FIG. 6. If the rod section 15 is thereby pressed against a radial inner bearing surface 66 of the recess 30, the engagement contour 60 would preferably be produced thereafter (FIG. 5). In this procedure, the rod section 15 is then pressed against the recess 30.

Figure 7:
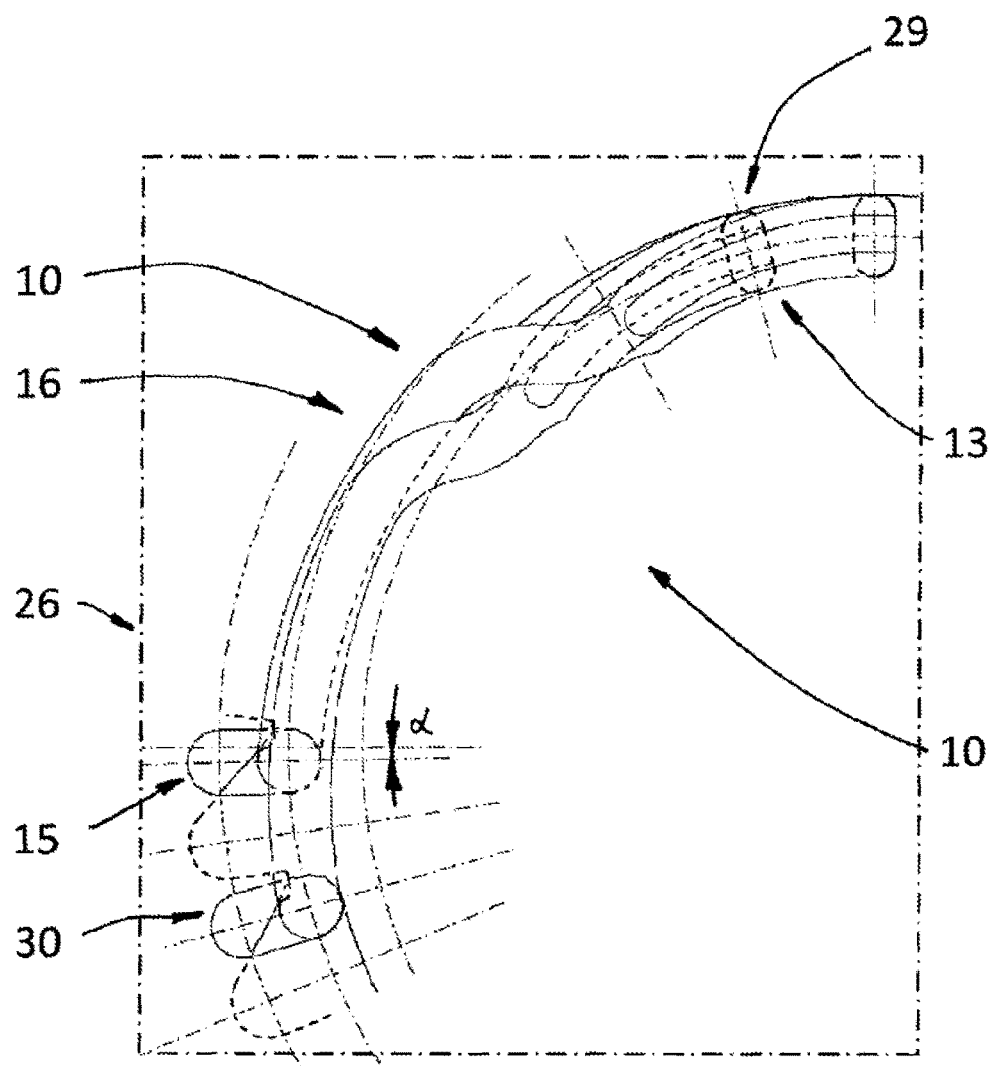
FIG. 7 shows how over-setting is carried out with the setting tool.
Figure 8:
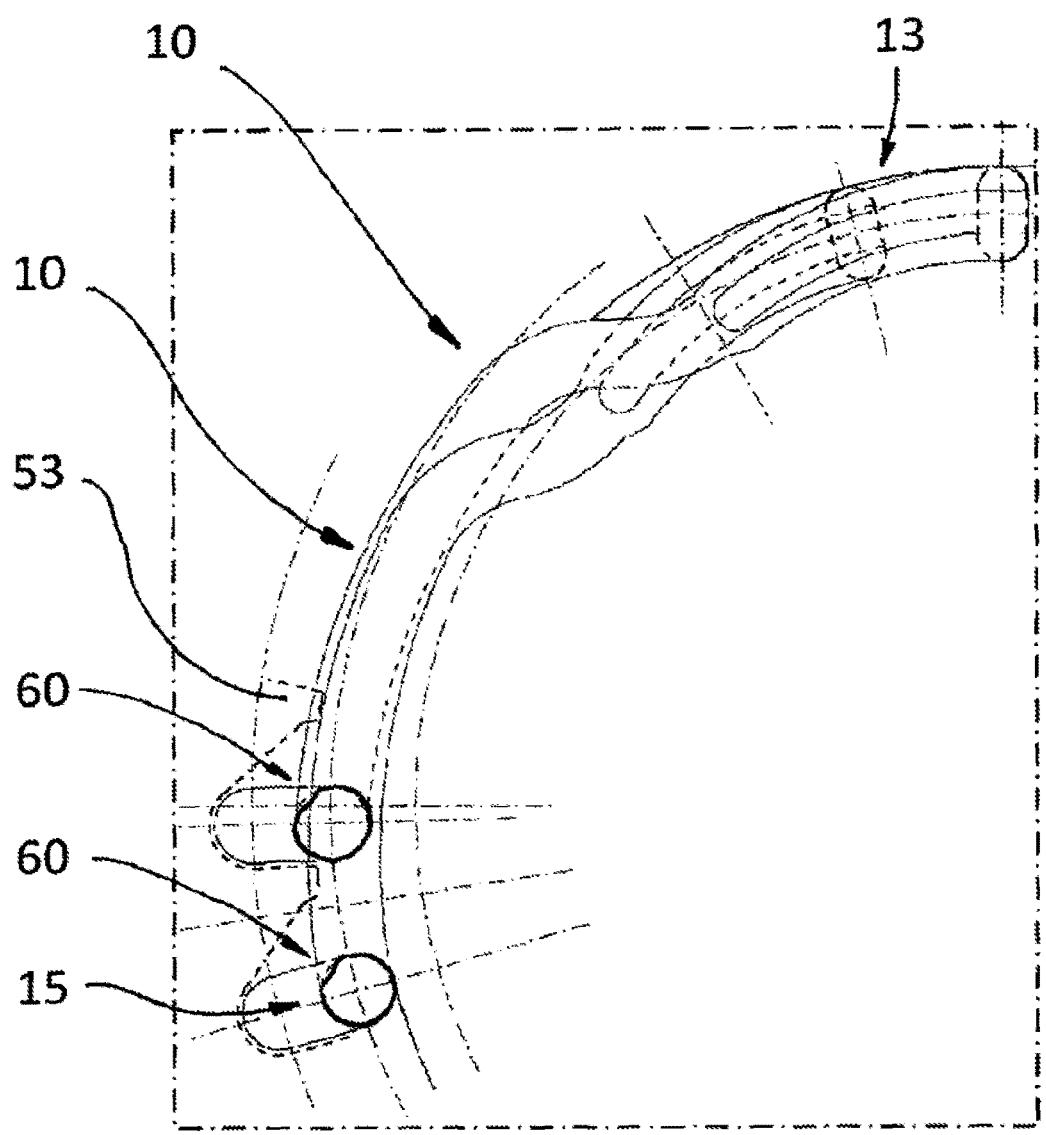
FIG. 8 shows a certain position of the setting tool.

It is provided that the gripping element 50 or the gripping elements 50 are driven in the direction of rotation. In that context, it is in particular provided that the one or more driven gripping elements 50 drive the outer tool part 26 in the direction of rotation by means of a stop element—preferably after passing through a free path. In that context, the two rod sections 13, 15 of a winding element 10 are in this case rotated further away from one another by for example at least five recesses 29 or, respectively, 30. Indeed, somewhat more rotation is effected, for example by an equalizing angle α of approximately 5°, in order to compensate for an elastic portion when bending the arcuate connection section 16 ("over-setting"), see FIG. 7. Preferably, after over-setting, the outer tool part 26 is rotated back by the equalizing angle α of approximately 5° in order to arrive at a so-called final position of the outer tool part 26. In this position of the outer tool part 26, the one or more gripping elements 50 are moved back to the point that the one or more teeth 53 disengage from the rod section 15 and its engagement contour 60, see FIG. 8.

Subsequently, the winding elements 10 can be removed from the setting tool 20. This is represented schematically in FIGS. 9a, 9b and 9c. As shown in FIG. 9a, a slider 69 presses the winding elements 10 from the side of their ends 41, 43 from the recesses 29 of the inner tool part 23 and the recesses 30 of the outer tool part 26 of the setting tool 20, such that the winding elements 10 are partially lifted out.

Figure 9C:
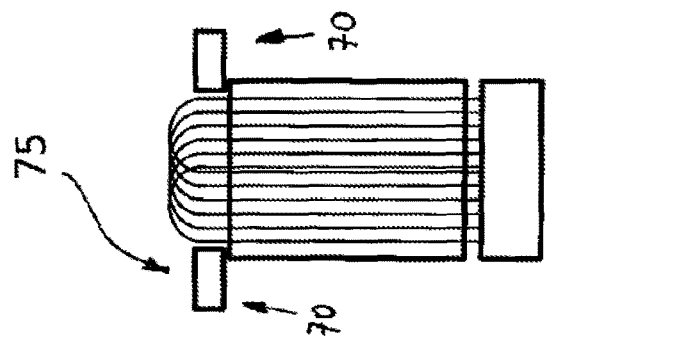
FIGS. 9a, 9b and 9c show, schematically, part of a procedure for removing the winding elements from the setting tool.
Figure 9B:
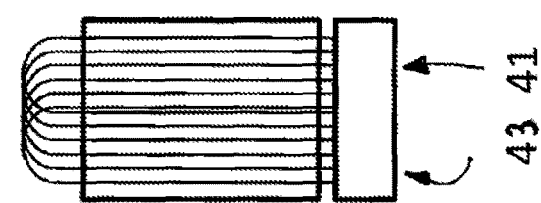
Figure 9A:
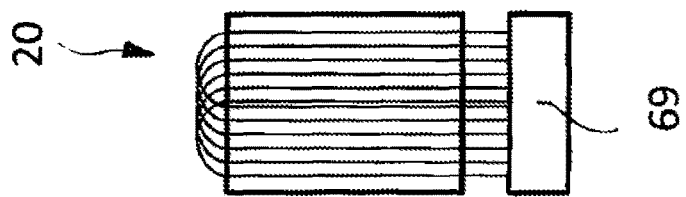

After this partial lifting out of the winding elements 10, those parts—in this case the upper parts—of the rod sections 13, 15 which are closest to the set, arcuate connection sections 16 are freely accessible from their side or from the side of the setting tool 20, such that a removal device 75 can remove the winding elements 10 from the setting tool 20, see FIG. 9c.

For removing the winding elements 10, sliders 70 are pushed between multiple winding elements 10 such that clamping forces FK are exerted between the winding elements 10 and the sliders 70 in the circumferential direction such that a winding element 10 is clamped between slider elements 78 and 79.

Figure 10:
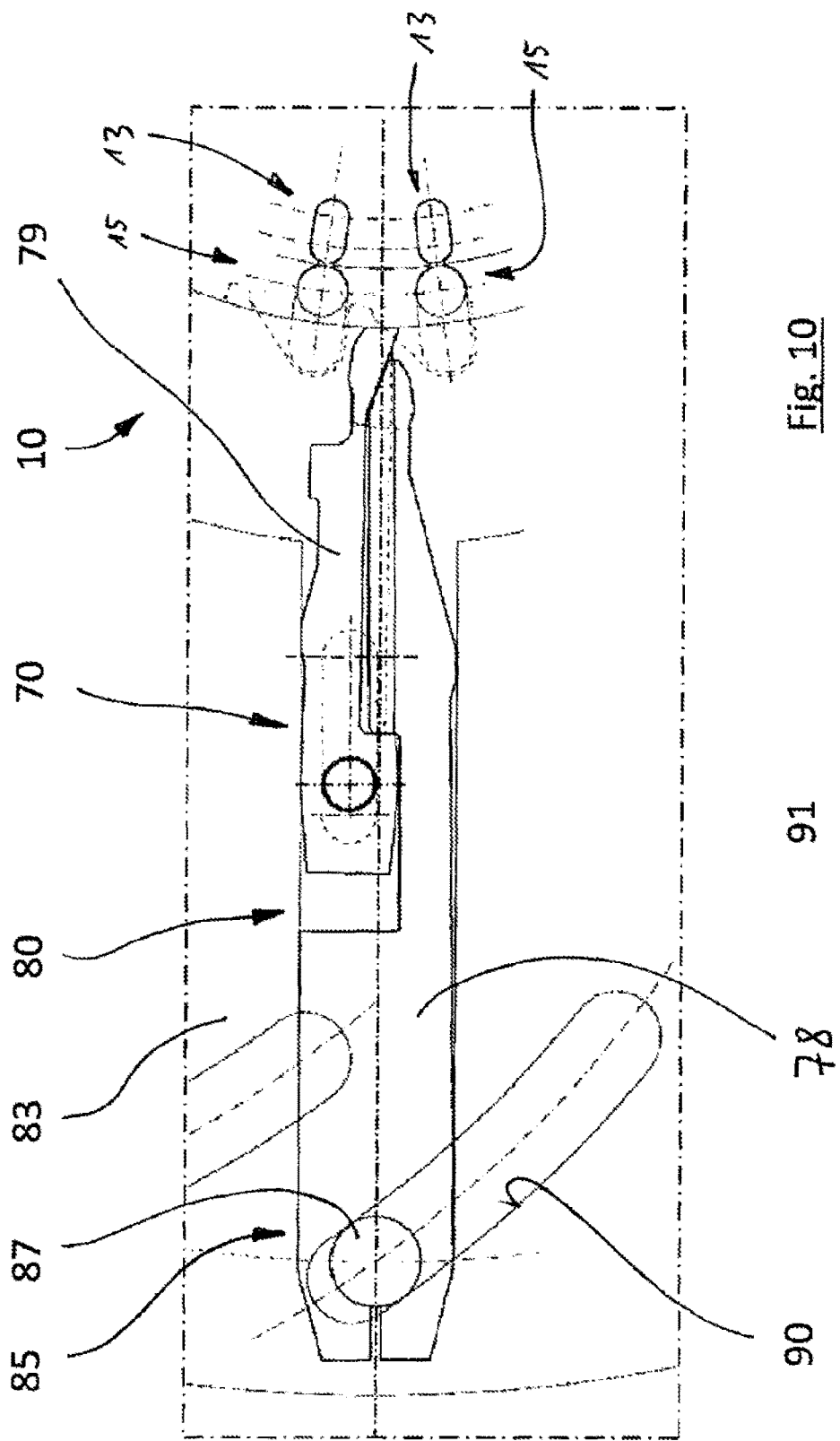
FIG. 10 shows a detail representation of two rod sections and two rod sections.
Figure 11:
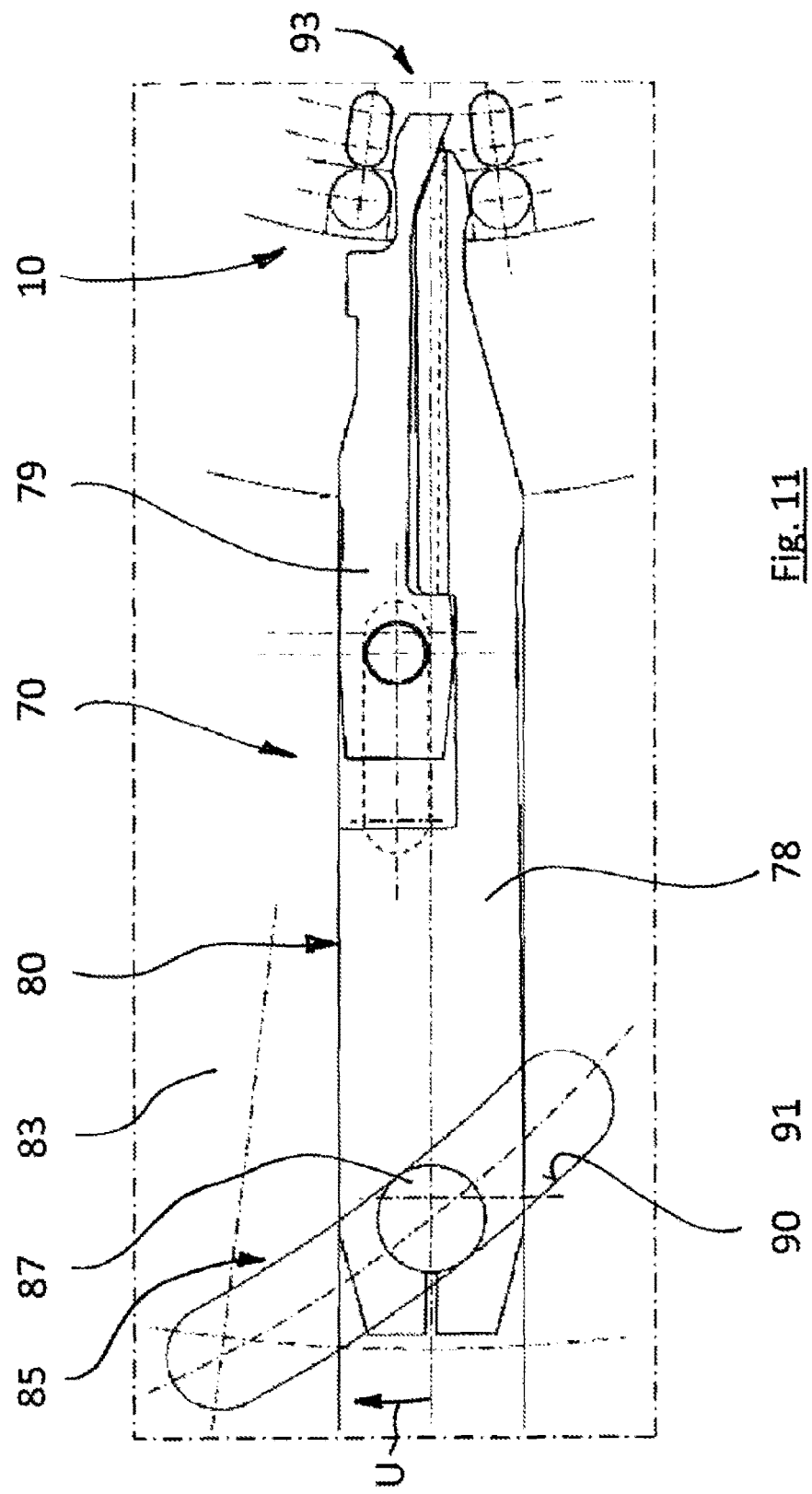
FIG. 11 shows how a lower flank of the slotted guide presses the slider between the (in this case four) rod sections.

FIG. 10 shows a detail representation of two rod sections 13 and two rod sections 15, a single guide 80 with a single slider 70, a slotted disk 83 with a slotted guide 85 for the slider 70 and its guide peg 87. The slider 70 also has the already-mentioned slider elements 78 and 79. The slider element 78 is able to move in the guide 80 in the radial direction. This slider element 78 is driven by the slotted disk 83 rotating about the axis of rotation 36, such that the slotted guide 85 thereof moves in the circumferential direction U. In order to push the slider 70 between multiple winding elements 10, the slotted disk 83 rotates clockwise (circumferential direction U). A lower flank 90 of the slotted guide 85 presses the slider 70 between the (in this case four) rod sections 13, 15, see FIG. 11. The slider element 79 is also pushed, via a guide peg 91, by a slotted disk (not shown here) by means of a slotted guide (also not shown here) at first simultaneously and at the same speed into the wedge-shaped interspace 93. The slider elements 78 and 79 are thus pushed together between the winding elements 10. For the purpose of effecting the clamping force FK in the circumferential direction, the slider element 78 is pushed into the wedge-shaped interspace 93 between the slider element 79 and a winding element 10.

Figure 12:
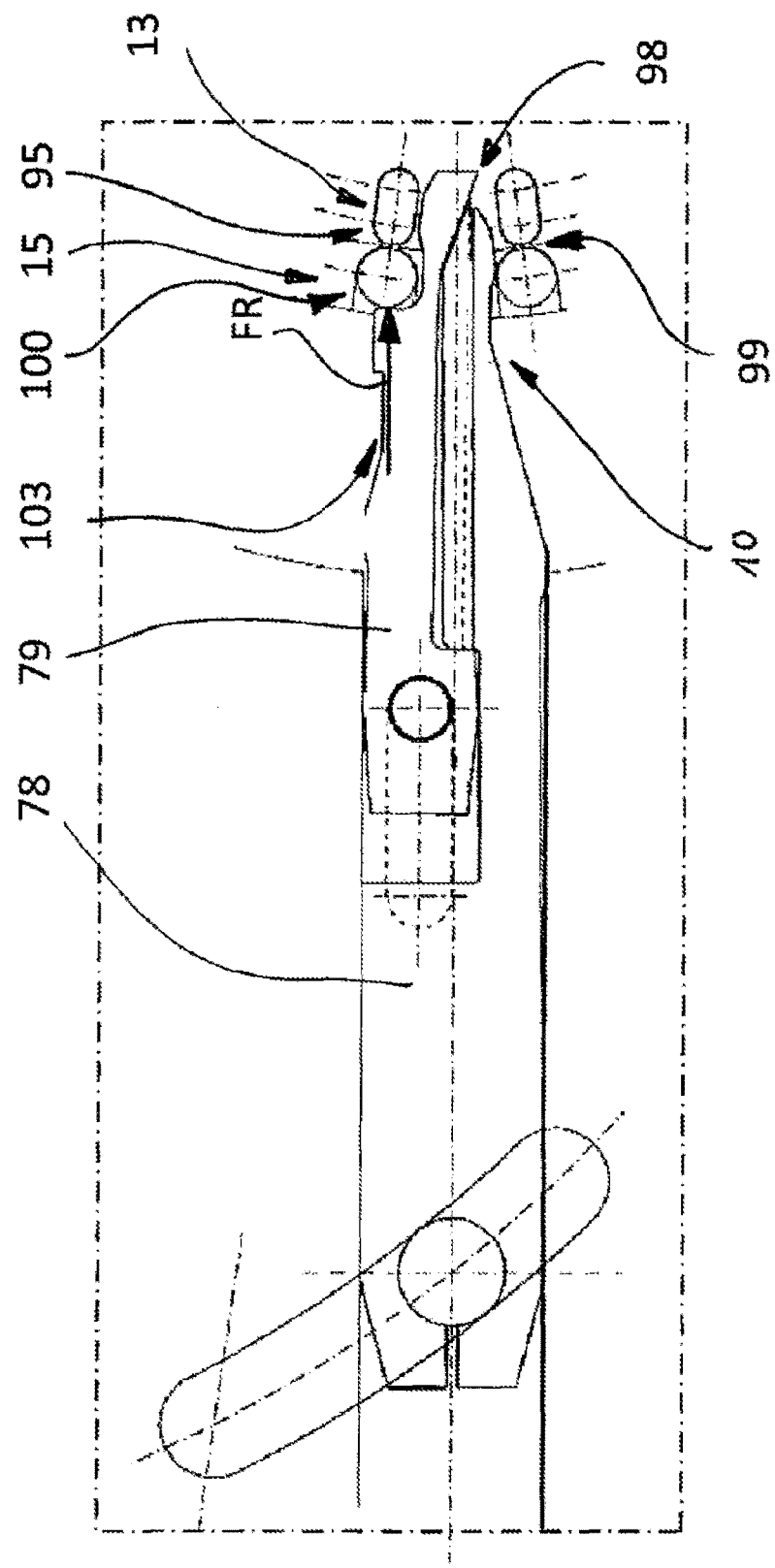
FIG. 12 shows a method step in which the slider element first exerts a force in the radial direction on a winding element or an outer rod section.

FIG. 12 shows the method step in which the slider element 79 first exerts a force FR in the radial direction on a winding element 10 or an outer rod section 15. In that context, the rod section 15 is pressed against the inner rim of the recess 30. The slider element 79 is now no longer pushed further radially inward. A cheek 95 is spaced apart a bit further in the circumferential direction with respect to the closest adjacent rod section 13 and thus does not yet exert a force in the circumferential direction on the rod section 13. On the rear side of the cheek 95 there is a bevel 98. The slider element 78 also has a cheek 99 and on the rear side of the cheek 99 there is a bevel 100. The slider element 79 thus first exerts the force FR in the radial direction and then the clamping force FK in the circumferential direction.

Figure 13:
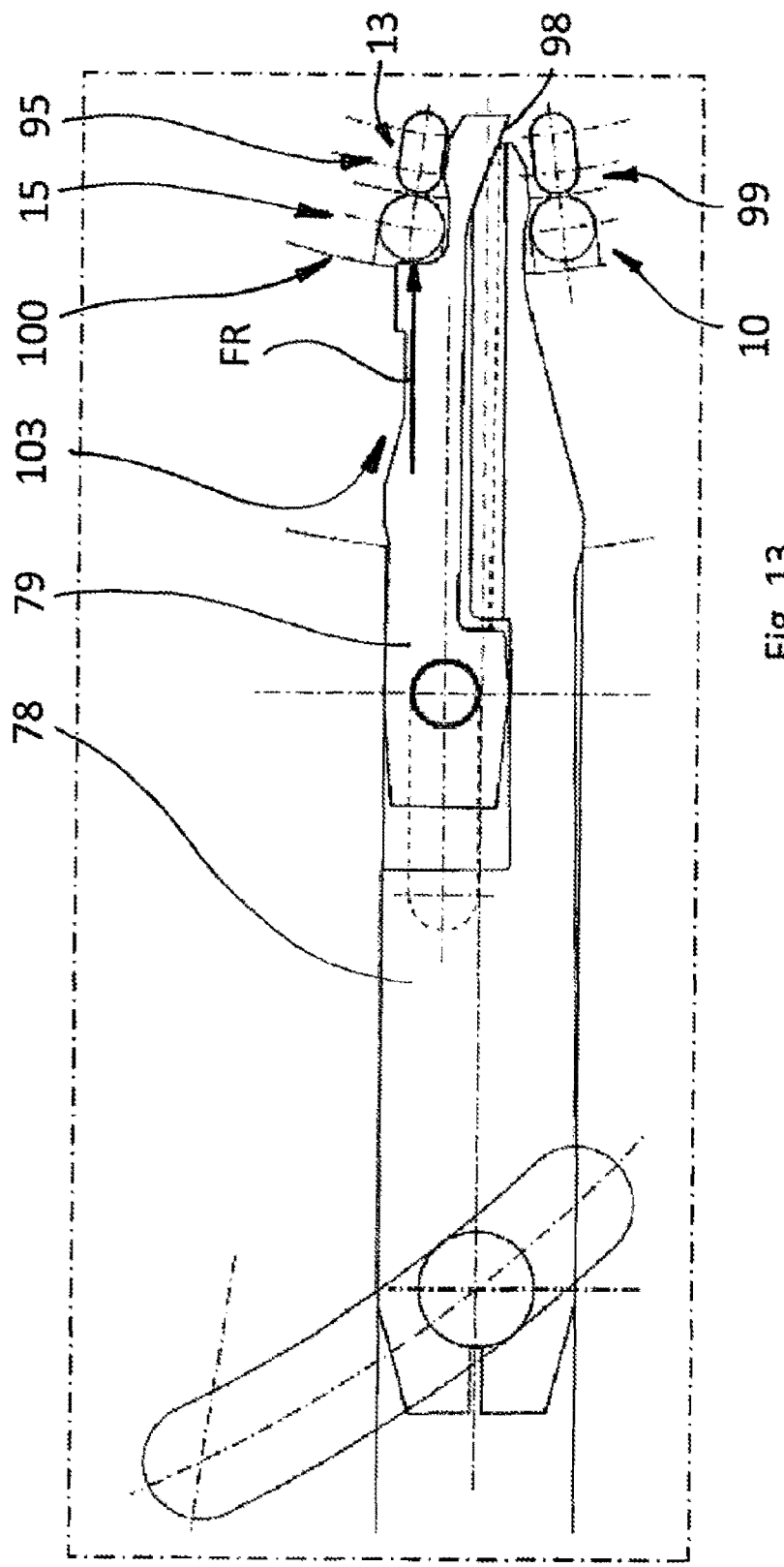
FIG. 13 shows how the slider element is pushed from behind the slider element.
Figure 14:
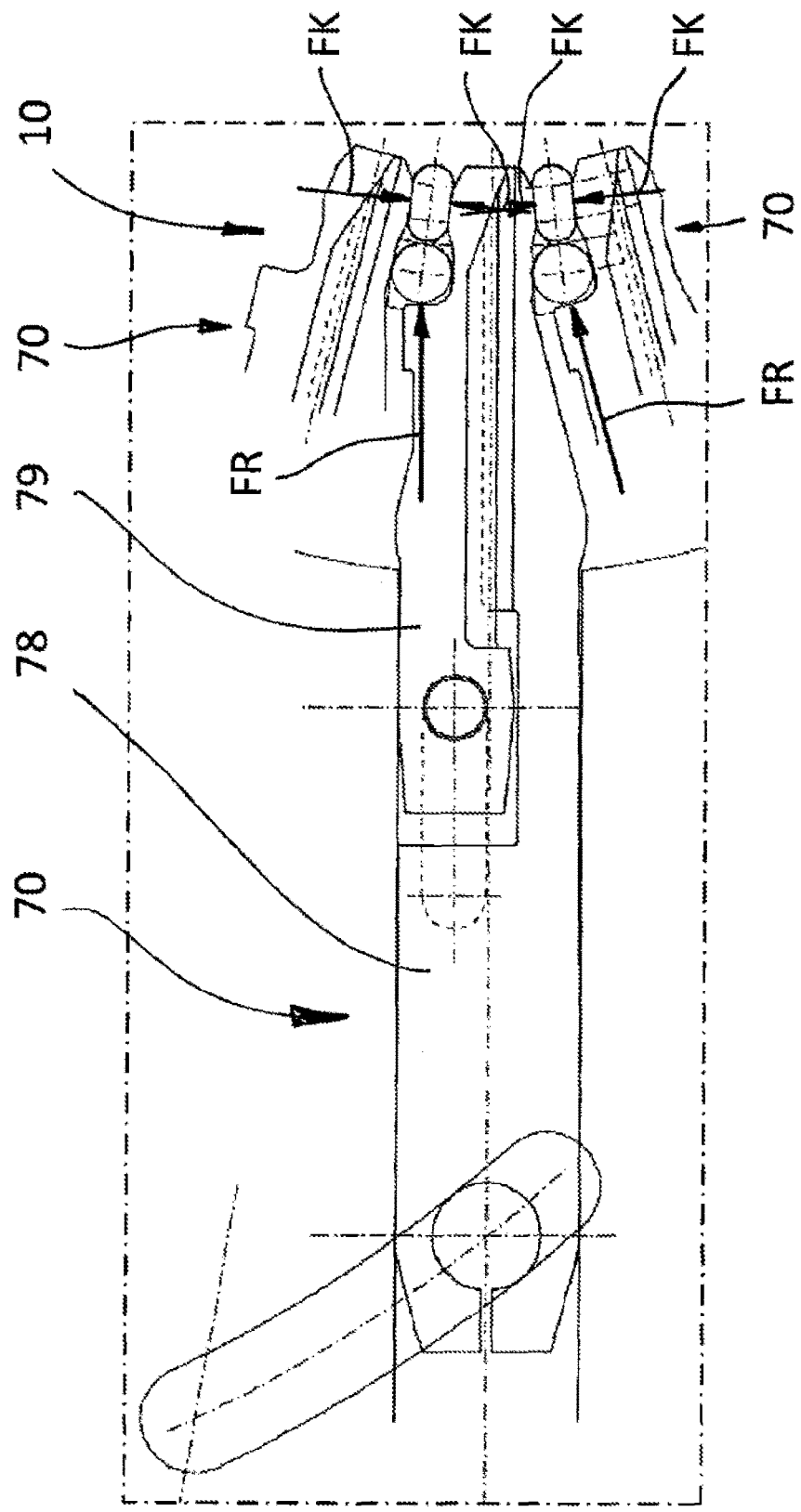
FIG. 14 shows how the clamping force between the two winding elements or the rod sections thereof is produced as a consequence of the slider element moving by sliding along the bevels.

In the continuation of the method, FIG. 13, the slider element 78 is pushed from behind the slider element 79. In that context, the bevel 100 of the slider element 78 presses with increased force against the bevel 98 of the slider element 79, such that the force FR is increased. Together with the movement of the slider element 78, the sliding along the bevels 98 and 100 produces the clamping force FK between the two winding elements 10 or the rod sections 13 thereof, see FIG. 14. The two bevels 98 and 100 are then in a common oblique plane 103, which is not oriented radially with respect to the axis of rotation. One clamping force FK is then transmitted via the cheek 95 to the upper rod section 13 and the other clamping force FK is transmitted via the cheek 99 to the lower rod section 13. Thus, for removing the winding elements 10, sliders 70 are pushed between multiple winding elements 10 such that clamping forces FK are exerted in the circumferential direction between winding elements 10 and sliders 70 such that a winding element 10 or its rod section 13 is clamped between slider elements 78 and 79.

Figure 16:
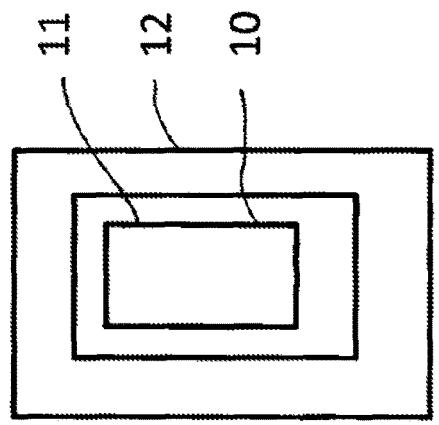
FIG. 16 is a schematic view of a U-shaped winding element for an electromagnetically excitable core of an electric rotation machine.

FIGS. 15a, 15b, 15c and 15d show method steps according to which, between all immediately adjacent rod sections 13, 15 which are arranged in a circumferentially adjacent recess 29 of an inner tool part 23 or in a recess 30 of an outer tool part 26 with a constant separation with respect to an axis of rotation 36, in each case one slider 70 simultaneously effects a clamping force FK on the immediately adjacent rod sections 13, 15 (FIG. 15a) and thereby an entirety of all the winding elements 10 against one another are removed from the setting tool 20 via the intermediary of the sliders 70 (FIG. 15b) and are then inserted into grooves (not shown) of an electromagnetically excitable core 11, FIGS. 15c and 15d. The core 11 can in this case be a body of a rotor with radially outward open grooves of an electric direct-current machine such as a starter for an internal combustion engine or also for example a stator with radially inward open grooves for an alternating-current generator, see FIG. 16.

The invention claimed is:

1. A method for forming at least one U-shaped winding element for an electromagnetically excitable core of an electric rotation machine, wherein the U-shaped winding element has a first rod section and a second rod section which are connected by an arcuate connection section, wherein an inner tool part having at least one recess in a region of an outer circumference is provided, and an outer tool part having at least one recess in a region of an inner circumference is provided, and at least the U-shaped winding element is inserted into the inner tool part and the outer tool part such that one rod section is inserted into a recess of the inner tool part, the other rod section is inserted into a recess of the outer tool part, and such that the inner tool part and the outer tool part are rotated with respect to one another about an axis of rotation, wherein in that context the first and second rod sections are moved away from one another, wherein, prior to the first and second rod sections being moved away from one another, a gripping element having a tooth is moved toward the second rod section, which is gripped by the tooth, wherein the arcuate connection section and parts of the first and second rod sections protrude from the inner and outer tool parts to define an overhanging portion of the U-shaped winding element, and the second rod section is gripped by the tooth in the overhanging portion of the U-shaped winding element.

2. The method according to claim 1, characterized in that in a further step the gripping element with the tooth presses an engagement contour into the second rod section by shaping the second rod section and thereby the tooth grips the second rod section in a form-fitting manner with an engagement force.

3. The method according to claim 2, characterized in that, by a sliding bevel, a pressing force is exerted on the second rod section which, in conjunction with the recess in the region of the inner circumference of the outer tool part, exerts a resulting force radially inward.

4. The method according to claim 3, characterized in that, prior to the tooth gripping the second rod section, the second rod section is pressed by the sliding bevel radially inward against a radial inner bearing surface of the recess of the outer tool part and then the engagement contour is produced.

5. The method according to claim 4, characterized in that the gripping element comprises one or more driven gripping elements that drive the outer tool part in a direction of rotation of the outer tool part.

6. The method according to claim 5, characterized in that the one or more driven gripping elements drive the outer tool part in the direction of rotation of the outer tool part, after passing through a free path.

7. The method according to claim 6, characterized in that, for over-setting, the first and second rod sections of the U-shaped winding element are rotated away from one another, taking into account an equalizing angle.

8. The method according to claim 7, characterized in that the tooth comprises one or more teeth, and wherein after the over-setting, the outer tool part is rotated back by the equalizing angle in order to arrive at a final position of the outer tool part in which the one or more driven gripping elements are moved back to a point that the one or more teeth disengage from the engagement contour of the second rod section.

9. The method according to claim 1, characterized in that the gripping element comprises one or more driven gripping elements that drive the outer tool part in a direction of rotation of the outer tool part.

10. The method according to claim 9, characterized in that the one or more driven gripping elements drive the outer tool part in the direction of rotation of the outer tool part, after passing through a free path.

11. The method according to claim 1, characterized in that, for over-setting, the first and second rod sections of the U-shaped winding element are rotated away from one another, taking into account an equalizing angle.

12. The method according to claim 11, characterized in that the gripping element comprises one or more gripping elements and the tooth comprises one or more teeth, and wherein after over-setting, the outer tool part is rotated back by the equalizing angle in order to arrive at a final position of the outer tool part in which the one or more gripping elements are moved back to a point that the one or more teeth disengage from an engagement contour of the second rod section.

13. A method for forming at least one U-shaped winding element for an electromagnetically excitable core of an electric rotation machine wherein the U-shaped winding element has a first rod section and a second rod section which are connected by an arcuate connection section wherein an inner tool part having at least one recess in a region of an outer circumference is provided, and an outer tool part having at least one recess in a region of an inner circumference is provided, and at least the U-shaped winding element is inserted into the inner tool part and the outer tool part such that one rod section is inserted into a recess of the inner tool part, the other rod section is inserted into a recess of the outer tool part, and such that the inner tool part and the outer tool part are rotated with respect to one another about an axis of rotation, wherein in that context the first and second rod sections are moved away from one another, wherein, prior to the first and second rod sections being moved away from one another, a gripping element having a tooth is moved toward the second rod section, which is gripped by the tooth, wherein for over-setting, the first and second rod sections of the U-shaped winding element are rotated away from one another, taking into account an equalizing angle, and wherein after over-setting, the outer tool part is rotated back by the equalizing angle in order to arrive at a final position of the outer tool part in which the one or more gripping elements are moved back to the point that the one or more teeth disengage from the second rod section and an engagement contour.

* * * * *